(12) United States Patent
Farmanbar et al.

(10) Patent No.: US 9,674,801 B2
(45) Date of Patent: Jun. 6, 2017

(54) UE POWER ALLOCATION ACCORDING TO SCHEDULER UTILITY METRIC FOR DL MU-MIMO AND DL COMP

(75) Inventors: Hamidreza Farmanbar, Ottawa (CA); Mohammadhadi Baligh, Ottawa (CA); Keyvan Zarifi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 856 days.

(21) Appl. No.: 13/558,713

(22) Filed: Jul. 26, 2012

(65) Prior Publication Data

US 2014/0029522 A1 Jan. 30, 2014

(51) Int. Cl.
| | |
|---|---|
| *H04W 52/42* | (2009.01) |
| *H04L 5/00* | (2006.01) |
| *H04B 7/024* | (2017.01) |
| *H04B 7/0426* | (2017.01) |
| *H04B 7/0452* | (2017.01) |
| *H04B 7/06* | (2006.01) |
| *H04W 52/34* | (2009.01) |
| *H04W 52/36* | (2009.01) |

(52) U.S. Cl.
CPC ............ *H04W 52/42* (2013.01); *H04B 7/024* (2013.01); *H04B 7/0426* (2013.01); *H04B 7/0452* (2013.01); *H04B 7/0626* (2013.01); *H04L 5/0035* (2013.01); *H04W 52/346* (2013.01); *H04W 52/367* (2013.01)

(58) Field of Classification Search
CPC ............... H04W 52/42; H04W 52/346; H04W 52/367; H04L 5/0035; H04B 7/024; H04B 7/0426; H04B 7/0626
See application file for complete search history.

(56) References Cited

U.S. PATENT DOCUMENTS

| | | | |
|---|---|---|---|
| 7,308,287 B2 * | 12/2007 | Vaidyanathan | 455/562.1 |
| 8,238,545 B2 * | 8/2012 | Dortschy et al. | 379/399.01 |
| 8,625,695 B2 * | 1/2014 | Khojastepour et al. | 375/267 |
| 8,787,249 B2 * | 7/2014 | Giaretta et al. | 370/328 |
| 8,792,373 B2 * | 7/2014 | Ko et al. | 370/252 |
| 2011/0105174 A1 * | 5/2011 | Pelletier et al. | 455/522 |
| 2011/0150114 A1 * | 6/2011 | Miao et al. | 375/260 |
| 2011/0286398 A1 * | 11/2011 | Chung et al. | 370/328 |
| 2011/0317748 A1 * | 12/2011 | Li et al. | 375/219 |

* cited by examiner

*Primary Examiner* — Alpus H Hsu
*Assistant Examiner* — Anthony Luo
(74) *Attorney, Agent, or Firm* — Slater Matsil, LLP (57) ABSTRACT

A system is provided for allocating downlink transmit power in a wireless multiple-input multiple-output (MIMO) system. During operation, the system identifies a set of receivers for receiving signals from one or more transmitters on a same time-frequency slot, receives channel state information (CSI) for communication channels between the identified receivers and the transmitters, and constructs a precoder based on the CSI. The system further derives a set of power-scale factors for the precoder based on a utility function associated with the identified receivers such that the power-scale factors optimize the utility function. A respective power-scale factor scales power transmitted to a corresponding receiver.

32 Claims, 6 Drawing Sheets

UE POWER ALLOCATION ACCORDING TO SCHEDULER UTILITY METRIC FOR DL MU-MIMO AND DL COMP

BACKGROUND

Field

This disclosure is generally related to power allocation in the downlink of a multi-user multiple-input multiple-output (MU-MIMO) system. More specifically, this disclosure is related to a method and system for allocating downlink transmission power based on a scheduler utility metric while satisfying power restriction conditions.

Related Art

Multiple-input multiple-output (MIMO) systems have tremendous potential in increasing the average throughput in cellular wireless communication systems. The performance gain in channel capacity, reliability, and spectral efficiency in single user (point-to-point) MIMO (SU-MIMO) systems has spurred the inclusion of SU-MIMO in various cellular and wireless communication standards. In cellular networks where spectrum scarcity/cost is a major concern, the ability to reuse spectrum resources is critically important. To further increase spectral efficiency in cellular networks, the spatial diversity of the users can be exploited to allow multi-user MIMO (MU-MIMO) transmissions.

In a wireless MU-MIMO system, a base station (such as an eNode-B in an LTE network) equipped with multiple antennas is capable of serving multiple user equipments (UEs), each of which may be equipped with one or multiple antennas, on the same time-frequency resources. On the downlink (from the eNode-B to the UEs), the eNode-B sends different data streams to the different UEs. Note that the broadcasting nature of the downlink means that signals intended for one UE may cause interference at the other co-served UEs. To maximize the overall system throughput, various precoding techniques can be used, in which the same signal is emitted from each of the transmit antennas with independent and appropriate weighting. For example, zero-forcing precoding allows the multiple-antenna transmitter to nullify multi-user interference signals.

In addition to precoding, power allocation to the co-served UEs also impacts the system performance. However, conventional MU-MIMO transmission schemes often rely on naïve power allocation schemes, where the system allocates equal transmission or receiving power to each UE.

SUMMARY

One embodiment of the present invention provides a system for allocating downlink transmit power in a wireless multiple-input multiple-output (MIMO) system. During operation, the system identifies a set of receivers for receiving signals from one or more transmitters on a same time-frequency slot, receives channel state information (CSI) for communication channels between the identified receivers and the transmitters, and constructs a precoder based on the CSI. The system further derives a set of power-scale factors for the precoder based on a utility function associated with the identified receivers such that the power-scale factors optimize the utility function. A respective power-scale factor scales power transmitted to a corresponding receiver.

In a variation on this embodiment, the selected utility function is a proportional fairness (PF) weighted sum rate.

In a variation on this embodiment, optimizing the utility function involves applying a power constraint requirement.

In a further variation, the power constraint requirement is applied to transmit power of each individual transmitter.

In a further variation, the power constraint requirement is applied to total transmit power of all transmitters.

In a further variation, the system identifies a transmitter having transmit power exceeding an allowed maximum value, and reduces power scale factors associated with the identified transmitter such that the transmit power of the identified transmitter is reduced to the allowed maximum value.

In a variation on this embodiment, optimizing the utility function involves using a dual-decomposition method.

In a variation on this embodiment, the precoder is a zero-forcing precoder.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide methods and systems for allocating power to UEs in the downlink of wireless MU-MIMO transmission and the downlink of Coordinated Multi-Point (CoMP) transmission. The transmission power to the co-served or paired UEs is determined based on a utility metric of the scheduler. In one embodiment, the scheduler uses a proportional fairness (PF) algorithm, and the utility metric is the weighted sum rate of all users. The optimization process takes into consideration the power restriction requirements of one or more transmitters, and reduces power from transmitters having excessive power.

In this disclosure, the term "node" refers to an entity in the network capable of sending, receiving, or forwarding information over a communication channel. In a wireless communication network, a node can be a base station (such as an LTE eNode-B), which serves as the hub of a local network, or a piece of user equipment (UE).

MIMO technology has attracted attention in wireless communications, because it offers significant increases in data throughput and link range without requiring additional bandwidth or increased transmit power. It achieves this goal by spreading the same total transmit power over multiple antennas. MIMO, particularly multi-user MIMO (MU-MIMO), technology has been an integral part of the Long Term Evolution (LTE) standards as specified in the 3GPP (3rd Generation Partnership Project) Release 8 to Release 10, which are available at the 3GPP website (www.3GPP.org).

Figure 1:
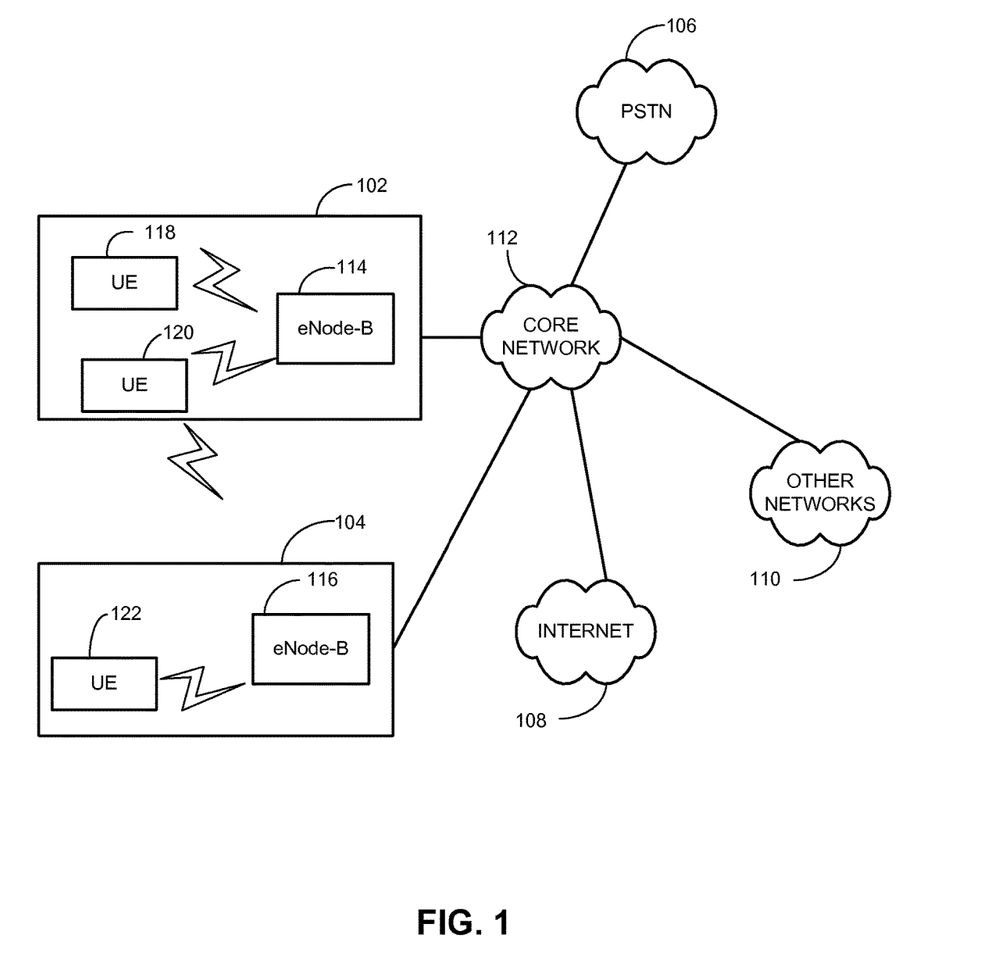
FIG. 1 presents a diagram illustrating a simplified view of an exemplary LTE architecture.

FIG. 1 presents a diagram illustrating a simplified view of an exemplary LTE architecture. In FIG. 1, a number of LTE eNode-Bs (such as eNode-Bs 114 and 116) are coupled to the public switched telephone network (PSTN) 106, the Internet 108, and other networks (such as network 110) via a core network 112. Each eNode-B communicates with a number of UEs via an air interface within a coverage cell. For example, eNode-B 114 communicates with UEs 118 and 120 with cell 102, and eNode-B 116 communicates with a UE 122 within cell 104.

According to the LTE standards, the eNode-Bs 114 and 116 are equipped with multiple antennas, and UEs 118-122 are each equipped with one or multiple antennas. In MU-MIMO transmission mode, an eNode-B (such as eNode-B 114) is able to transmit to multiple spatially distinguishable UEs (such as UEs 118 and 120) using the same time-frequency slot. Note that various precoding techniques can be used at eNode-B 114 to ensure transmission directionality, thus transforming the cross-coupled channels into parallel non-interacting channels.

Although the present disclosure is presented using examples based on the LTE standards, embodiments of the present invention are not limited to LTE networks. The principles demonstrated by embodiments of the present invention are also applicable to other types of network that implements MIMO transmission technologies, including, but are not limited to: WiFi, WiMAX (Worldwide Interoperability for Microwave Access), and HSPA+ (High-Speed Packet Access Plus).

Assuming that the number of paired UEs in an LTE cell (such as cell 102) is K, the eNode-B of the cell (such as eNode-B 114) is equipped with $N_T$ transmitting antennas, and each UE (such as UE 118 or 120) is equipped with $N_R$ receiving antennas, the system model can be described as follows.

Given the data vector for the UEs being $u=[u_1, u_2, \ldots, u_K]^T$, the transmitted signal can be expressed as:

$$x_{N_T \times 1} = P_{N_T \times K} u_{K \times 1}, \quad (1)$$

where $P_{N_T \times K}$ is the precoder matrix. Note that here it is assumed that one layer per UE is transmitted and the number of UEs is no greater than the number of transmitting antennas of the eNode-B, i.e., $N_T \geq K$.

The received signal vector at UE k, $y_k$, can be expressed as:

$$y_k = H_k x + n_k \quad (2)$$

where $H_k$ is a $N_R \times N_T$ channel matrix representing the channel from eNode-B 102 to UE k, $k=1, 2, \ldots, K$, and $n_k$ denotes the additive white Gaussian noise with distribution $N(0, N_0 I_{N_R})$ at UE k. The overall MU-MIMO channel matrix $H_{KN_R \times N_T}$ is given by: $H=[H_1, H_2, \ldots, H_K]^T$.

Applying singular value decomposition (SVD) to the channel matrix of the $k_{th}$ UE, one can get:

$$H_k = U_k \Lambda_k V_k^H. \quad (3)$$

Assume each UE applies an SVD receiver of its own channel for one received layer, i.e., $$\tilde{y}_k = [U_k]_{1st\ column}^H y_k = \lambda_k [V_k]_{1st\ column}^H x + \tilde{n}_k, k=1, \ldots, K, \quad (4)$$

where $\lambda_k$ is the largest (first) singular value of $H_k$ and $[U_k]_{1st\ column}$ and $[V_k]_{1st\ column}$ are the corresponding vectors. Eq. (4) can be put into vector form as:

$$\tilde{y} = \begin{bmatrix} \tilde{y}_1 \\ \vdots \\ \tilde{y}_K \end{bmatrix} = \underbrace{\begin{bmatrix} \lambda_1 & \cdots & 0 \\ \vdots & \ddots & \vdots \\ 0 & \cdots & \lambda_K \end{bmatrix}_{K \times K} \begin{bmatrix} [V_1]_{1st\ column}^H \\ \cdots \\ [V_K]_{1st\ column}^H \end{bmatrix}_{K \times N_T}}_{H_{eff}} x_{N_T \times 1} + \tilde{n}_{K \times 1}. \quad (5)$$

Based on Eq. (5), one can define appropriate precoders. For example, the zero-forcing precoder can be defined by:

$$P = H_{eff}^H (H_{eff} H_{eff}^H)^{-1}. \quad (6)$$

When considering power allocation to UEs, the zero-forcing precoder can be scaled using a power allocation matrix D to provide arbitrary power allocation to the UEs. Accordingly, the zero-forcing precoder with power allocation consideration is expressed as:

$$P_{N_T \times K} = H_{eff}^H (H_{eff} H_{eff}^H)^{-1} D, \quad (7)$$

where D is a diagonal matrix. This scaled precoder is subject to the total transmit power constraint. For example, for a normalized precoder with total transmission power of 1, the transmit power constraint is expressed as:

$$Tr(P^H P) = Tr(D^2 (H_{eff} H_{eff}^H)^{-1}) = 1. \quad (8)$$

Now let $v_k = [(H_{eff} H_{eff}^H)^{-1}]_{kk}$ and $$D = \begin{bmatrix} d_1 & \cdots & 0 \\ \vdots & \ddots & \vdots \\ 0 & \cdots & d_K \end{bmatrix},$$

where $d_k$ is the power-transmission scaling value for UE k, and the transmit power constraint can be written as:

$$\sum_{k=1}^{K} v_k d_k^2 = 1. \quad (9)$$

Conventional schemes often apply a naïve way of allocating transmission power for paired UEs, such as allocating equal transmitting or receiving power to each UE. For zero-forcing precoding with equal transmitting power per UE, the scaling values are given as:

$$d_k = \frac{1}{\sqrt{K v_k}}, k=1, \ldots, K. \quad (10)$$

For zero-forcing precoding with equal receiving power per UE, the scaling values are given as:

$$d_1 = \ldots = d_K = \frac{1}{\sqrt{\sum_{k=1}^{K} v_k}}. \tag{11}$$

However, these naïve power-allocation schemes are less adequate in providing optimal system performance. It is desirable to have a smart UE power-allocation scheme for the MU-MIMO transmission. In embodiments of the present embodiment, power allocation for paired UEs is determined based on a utility metric of the scheduler. In MU-MIMO, the scheduler is responsible for pairing spatially separated UEs for co-transmission and allocating appropriate resources for each UE. Different types of scheduler utility metrics can be used to determine transmission power to paired UEs. In one embodiment, the system uses a proportional fairness (PF) utility metric to determine optimal values of the power-transmission scaling values $d_k$. In a further embodiment, the system determines the optimal values of $d_k$ by maximizing the weighted sum rate $$\left( \sum_{k=1}^{K} w_k r_k \right)$$

of the paired UEs, where $w_k$ is the PF weight of UE $k$; and $r_k$ is the instantaneous rate of UE $k$, which is a function of the allocated power to UE $k$.

In one embodiment, while performing the optimization, the system uses the high signal-to-noise ratio (SNR) approximation of the Shannon capacity as the instantaneous rate of UE $k$, and formula (12) becomes:

$$\sum_{k=1}^{K} w_k r_k = \sum_{k=1}^{K} w_k \log SNR = \sum_{k=1}^{K} w_k \log\left(\frac{d_k^2}{N_k}\right), \tag{12}$$

where $N_k$ measures the variations of noise and interference at UE $k$. Hence, the optimization problem for power allocation becomes:

$$\max_{\{\delta_1, \ldots, \delta_K\}} \sum_{k=1}^{K} (w_k \log \delta_k - w_k \log N_k) \tag{13}$$

$$\text{s.t.} \sum_{k=1}^{K} v_k \delta_k = 1 \quad \delta_k > 0, k = 1, \ldots, K,$$

where $\delta_k = d_k^2$, $k=1, \ldots, K$. Note that the transmit power is normalized to 1.

Note that a closed-form solution for optimization problem (13) exists if we assume the noise-and-interference variations, $N_k$, are negligible compared with $\delta_1, \ldots, \delta_K$. The closed-form solution is:

$$\delta_k = \frac{1}{v_k} \frac{w_k}{\sum_{k=1}^{K} w_k}, \quad k = 1, \ldots, K. \tag{14}$$

It's worth pointing out that, when all PF weights are equal, i.e., $w_1 = w_2 = \ldots = w_K$, the optimal solution given by Eq. (14) is reduced to the equal-transmitting-power-allocation solution given by Eq. (10). Note that when the noise-and-interference variations, $N_k$, are not negligible compared with $\delta_1, \ldots, \delta_K$, no closed-form solution is available, and an appropriate optimization algorithm needs to be applied to find an optimal solution for $\delta_k$.

In one more embodiment, while performing the optimization, the system uses the Shannon capacity as the instantaneous rate of UE $k$, and formula (12) becomes:

$$\sum_{k=1}^{K} w_k r_k = \sum_{k=1}^{K} w_k \log(1 + SNR) = \sum_{k=1}^{K} w_k \log\left(1 + \frac{\delta_k}{N_k}\right), \tag{15}$$

and the optimization problem for power allocation becomes:

$$\max_{\{\delta_1, \ldots, \delta_K\}} \sum_{k=1}^{K} \left( w_k \log\left(1 + \frac{\delta_k}{N_k}\right) \right) \tag{16}$$

$$\text{s.t.} \sum_{k=1}^{K} v_k \delta_k = 1 \quad \delta_k \geq 0, k = 1, \ldots, K.$$

Similarly, we can assume that the noise-and-interference terms, $N_k$, are negligible compared with $\delta_1, \ldots, \delta_K$, and the optimization problem becomes a convex problem and can be solved using a dual-decomposition method.

In one embodiment, optimization problem (16) can be decomposed as a master optimization problem and a slave optimization problem. The slave optimization problem is given by:

$$\max_{\delta_k \geq 0} \left( w_k \log\left(1 + \frac{\delta_k}{N_k}\right) - \lambda v_k \delta_k \right), \tag{17}$$

where $\lambda > 0$ is the Lagrange multiplier. The solution for slave optimization problem (17) is given by:

$$\hat{\delta}_k = \begin{cases} 0 & \text{if } N_k - \frac{w_k}{\lambda v_k} \geq 0 \\ -N_k + \frac{w_k}{\lambda v_k} & \text{otherwise.} \end{cases} \tag{18}$$

The master optimization problem is given by:

$$\min_{\lambda} \left( \lambda + \sum_{k=1}^{K} \left( w_k \log\left(1 + \frac{\hat{\delta}_k}{N_k}\right) - \lambda v_k \hat{\delta}_k \right) \right). \tag{19}$$

Let $S$ be the set of indices $k$ for which $\hat{\delta}_k > 0$. Plugging solution of slave optimization problem (17) into master optimization problem (19), the master optimization problem becomes:

$$\min_{\lambda} \left( \lambda + \sum_{k \in S} \left( w_k \log\left(\frac{w_k}{\lambda v_k N_k}\right) - w_k + \lambda v_k N_k \right) \right). \quad (20)$$

The solution for master optimization problem (20) is:

$$\lambda = \frac{\sum_{k \in S} w_k}{1 + \sum_{k \in S} v_k N_k}. \quad (21)$$

A number of operations involving Eqs. (18) and (20) are iterated in order to obtain the optimal values of $\delta_k$.

Figure 2:
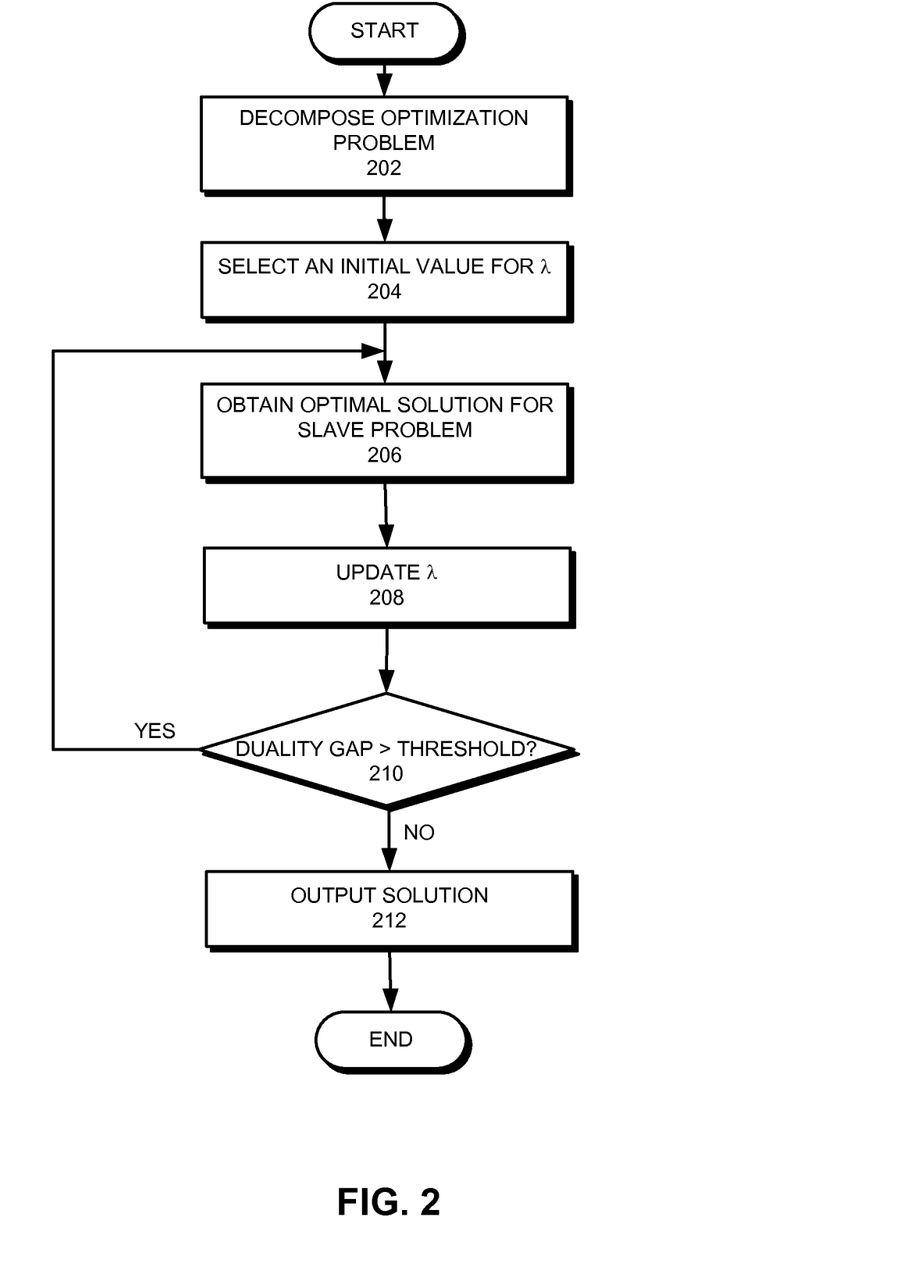
FIG. 2 presents a flowchart illustrating an exemplary process of solving the optimization problem for power allocation using a dual-decomposition method, in accordance with an embodiment of the present invention.

FIG. 2 presents a flowchart illustrating an exemplary process of solving the optimization problem for power allocation using a dual-decomposition method, in accordance with an embodiment of the present invention. In operation 202, the power-allocation optimization problem is decomposed into a master optimization problem and a slave optimization problem. In one embodiment, the master optimization problem and the slave optimization problem are given as (17) and (19). Subsequently, an initial value of the Lagrange multiplier λ is set (operation 204). Note that the value of λ needs to be greater than 1. In one embodiment, the initial value of the Lagrange multiplier λ is set as 1. Using the initial value of λ, the optimal solution of the slave optimization problem is obtained (operation 206). In one embodiment, the optimal solution of the slave optimization problem is calculated based on Eq. (18). Subsequently, the Lagrange multiplier λ is updated based on the optimal solution of the slave optimization problem (operation 208). In one embodiment, Lagrange multiplier λ is updated based on Eq. (21) which involves obtaining S (the set of indices k for which $\hat{\delta}_k > 0$). It is then determined whether the duality gap (defined as $$\left| \lambda \left( 1 - \sum_{k=1}^{K} v_k \delta_k \right) \right|$$

is greater than a predetermined threshold ε (operation 210). If so, the system returns to operation 206. Otherwise, convergence is reached, and the system outputs the solution to the power-allocation optimization problem, $\hat{\delta}_1, \ldots, \hat{\delta}_K$ (operation 212). Note that by applying dual decomposition, the optimal solution for power allocation can be obtained with only a few iterations.

Coordinated Multi-Point (CoMP) transmission is a new technology based on network MIMO. By coordinating and combining signals from multiple antennas, CoMP allows mobile users of a cellular network to enjoy consistent performance and quality whether they are at the center of a cell or at its outer edges. More specifically, it allows a UE at the cell edge to receive coordinated signals from multiple cell sites, thus significantly increasing the downlink (DL) performance.

Figure 3:
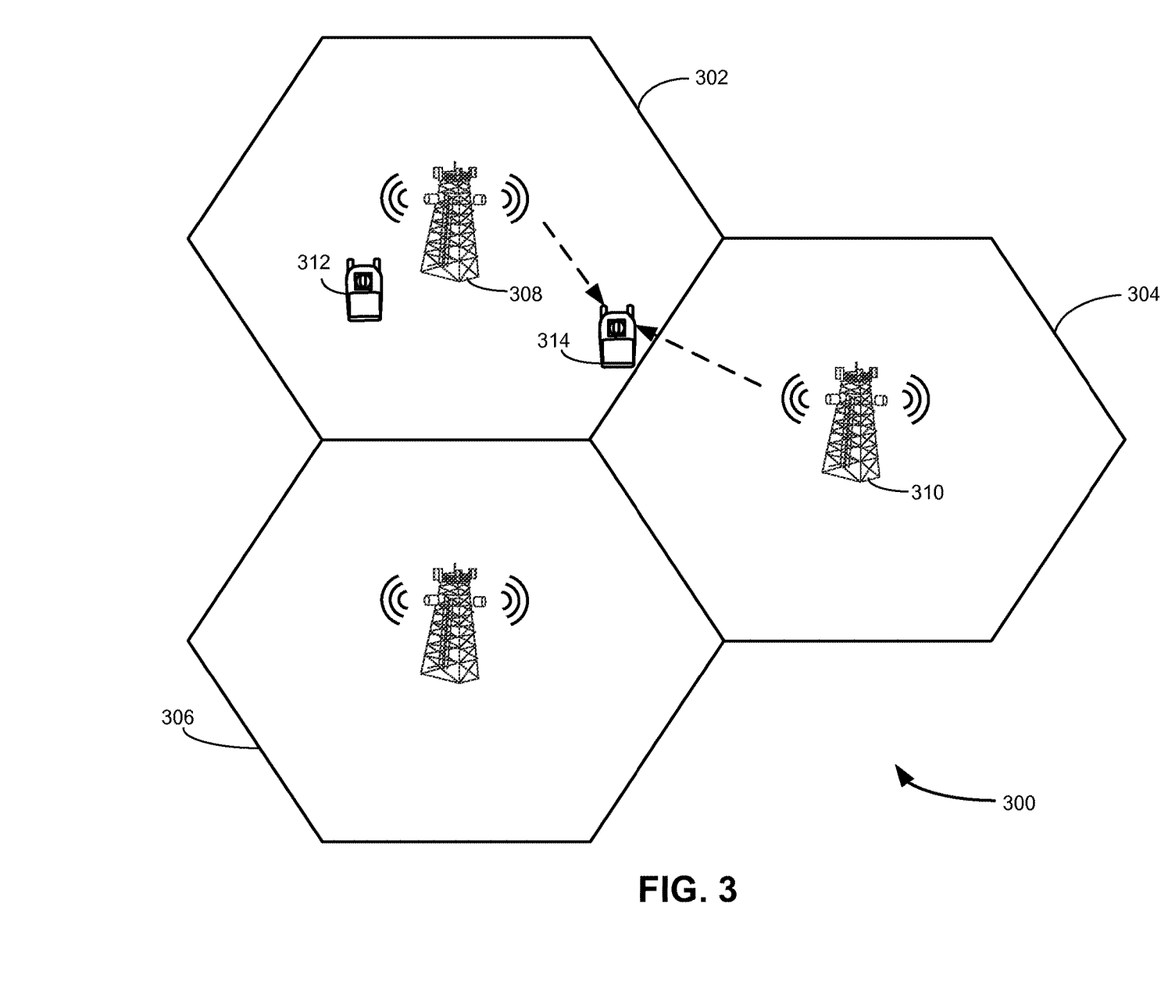
FIG. 3 presents a diagram illustrating an exemplary network implementing Coordinated Multi-Point (CoMP) transmission.

FIG. 3 presents a diagram illustrating an exemplary network implementing CoMP. Network 300 includes a number of cells, such as cells 302, 304, and 306. Each cell includes a base station (BS), which communicates with a number of UEs within the cell. For example, cell 302 includes a BS 308, and cell 304 includes a BS 310. BS 308 communicates with UEs in cell 302, including UEs 312 and 314. Because UE 314 is at the edge between cell 302 and 304, it is able to receive signals from BS 308 and BS 310. Hence, by coordinating the transmission to UE 314 between BS 308 and BS 310, UE 314 can achieve better downlink performance.

CoMP MU-MIMO refers to coordinated transmission to a number of paired UEs from multiple transmission points, in practice cell sites. Note that because the transmitters are located at different cell sites, the transmission power restriction is often applied to each individual site (each eNode-B) having a set of antennas, instead of being applied to all transmitting antennas as in the case of non-CoMP MU-MIMO transmission. Moreover, the power restriction may also be applied to individual antennas or to a group of antennas that is bigger or smaller than the number of antennas in an eNode-B. Without losing generality, in this disclosure, it is assumed that the power restriction is applied to each eNode-B.

Now, considering M eNode-Bs, each with $N_T$ antennas cooperating for CoMP transmission to K paired UEs using MU-MIMO, similar to Eq. (7), the zero-forcing CoMP MU-MIMO precoder can be expressed as:

$$P_{MN_T \times K} = H^H (HH^H)^{-1} D \quad (22)$$

$$= P^o_{MN_T \times K} D_{K \times K}$$

$$= \begin{bmatrix} P^o_1 \\ P^o_2 \\ \vdots \\ P^o_M \end{bmatrix} D$$

$$= \begin{bmatrix} P^o_1 D \\ P^o_2 D \\ \vdots \\ P^o_M D \end{bmatrix},$$

where $H_{K \times MN_T}$ is the CoMP MU-MIMO channel. Note that, in general, different eNode-Bs may have different numbers of transmitter antennas. For convenience of presentation, here we assume all eNode-Bs have the same number of antennas. Similar to Eqs. (8) and (9), the power restriction for each eNode-B can be written as:

$$Tr((P^o_m D)^H (P^o_m D)) = Tr(D^2 P^{oH}_m P^o_m) \quad (23)$$

$$= \sum_{k=1}^{K} [P^{oH}_m P^o_m]_{kk} d_k^2$$

$$= \sum_{k=1}^{K} v_{mk} \delta_k \le 1 \quad m = 1, \ldots, M,$$

meaning the transmit power of each eNode-B cannot exceed the maximum allowed power. For simplicity, in Eq. (23), the maximum allowed transmit power for each eNode-B is normalized. In practice, the maximum allowed transmit power for different eNode-Bs can be different.

One conventional approach for satisfying power constraints in (23) is a power back-off scheme. In this scheme, power-allocation matrix D=αI, or, equivalently, $\delta_k = \sqrt{\alpha}$, k=1, . . . , K, is selected where α>0 is a scalar small enough to satisfy all inequalities in (23). Another known approach is a per-layer power back-off scheme. In this approach, the initial matrix D may be chosen arbitrarily. Then, starting from the largest term $V_{mk}\delta_k$ in the most violated inequalities in (23), $\delta_k$ are reduced one by one until all inequalities in (23) are satisfied. Both approaches rely on reducing the power transmitted to the UEs, and hence, may result in substantial performance loss.

In contrast, in embodiments of the present invention, under CoMP MU-MIMO settings, transmit power is allocated to paired UEs based on a scheduler utility metric (similar to the MU-MIMO cases) while satisfying power restriction requirement to a single antenna or groups of antennas. In one embodiment, the scheduler utility metric is the PF weighed sum rate and the power constraints are applied to each individual eNode-B. In a further embodiment, the power constraints are applied to subsets of antennas within each individual eNode-B. Using high SNR approximation, the power-allocation optimization problem can be written as:

$$\max_{\{\delta_1,\ldots,\delta_K\}} \sum_{k=1}^{K} w_k \log \delta_k \qquad (24)$$

$$\text{s.t.} \sum_{k=1}^{K} v_{mk}\delta_k \leq 1 \quad m=1,\ldots,M.$$

Note that compared with optimization problem (13), optimization problem (24) includes multiple inequality constraints, meaning that the transmission power for a single eNode-B is limited to its maximum allowed value. Different from (13), no closed-form solution is available for (24). On the other hand, optimization problem (24) is a convex optimization problem with Lagrangian given by:

$$L(\delta, \lambda) = \sum_{k=1}^{K} w_k \log \delta_k + \sum_{m=1}^{M} \lambda_m \left(1 - \sum_{k=1}^{K} v_{mk}\delta_k\right) \qquad (25)$$

$$= \sum_{m=1}^{M} \lambda_m + \sum_{k=1}^{K} \left( w_k \log \delta_k - \left(\sum_{m=1}^{M} \lambda_m v_{mk}\right) \delta_k \right).$$

$$\lambda_m \geq 0, \quad m=1,\ldots,M$$

Various techniques can be used to solve optimization problem (24). In one embodiment, a dual-decomposition technique is used. The slave optimization problem is given by:

$$\max_{\delta \geq 0} \left( w_k \log \delta_k - \left(\sum_{m=1}^{M} \lambda_m v_{mk}\right) \delta_k \right), \qquad (26)$$

and the solution is given by:

$$\hat{\delta}_k = \frac{w_k}{\sum_{m=1}^{M} \lambda_m v_{mk}} \quad k=1,\ldots,K. \qquad (27)$$

The master optimization problem is given by:

$$\min_{\lambda \geq 0} \left( \sum_{m=1}^{M} \lambda_m + \sum_{k=1}^{K} \left( w_k \log \hat{\delta}_k - \left(\sum_{m=1}^{M} \lambda_m v_{mk}\right) \hat{\delta}_k \right) \right). \qquad (28)$$

Note that, unlike the non-CoMP cases disclosed in the previous section, the Lagrange multipliers $\{\lambda\}$ cannot be solved easily. In one embodiment, a steepest descent approach is used to obtain $\{\lambda\}$. Accordingly, the Lagrange multipliers $\{\lambda\}$ can be updated as:

$$\lambda_m(t+1) = \left[ \lambda_m(t) - \alpha \left(1 - \sum_{k=1}^{K} v_{mk}\hat{\delta}_k\right) \right]^+, m=1,\ldots,M, \qquad (29)$$

where $\alpha$ is the step size, and t is the iteration number. Similar to the process shown in FIG. 2, $\hat{\delta}_k$ and $\lambda_m$ can be updated iteratively until the duality gap (defined as $$\left| \sum_{m=1}^{M} \lambda_m \left(1 - \sum_{k=1}^{K} v_{mk}\hat{\delta}_k\right) \right|$$

is equal to or less than a predetermined threshold, $\epsilon$. Subsequently, the optimal power-loading solution, $\hat{\delta}_k$, k=1, . . . , K, is outputted. Note that with proper selection of step size, this optimization algorithm is guaranteed to converge.

If the power constraints in (24) are equality power constrains, the optimization problem becomes:

$$\max_{\{\delta_1,\ldots,\delta_K\}} \sum_{k=1}^{K} w_k \log \delta_k \qquad (30)$$

$$\text{s.t.} \sum_{k=1}^{K} v_{mk}\delta_k = 1 \quad m=1,\ldots,M.$$

In other words, all BSs are transmitting with maximum allowed power. Written in matrix form, the power constraint is:

$$V\delta = 1 \qquad (31)$$

where V is a M×K matrix with $[V]_{mk}=v_{mk}$, $\delta$ is a K×1 vector with $[\delta]_k=\delta_k$, and 1 is a M×1 vector of all 1. Assuming that M≤K, the minimum-norm solution to $\delta$ is given by:

$$\hat{\delta}=V^H(VV^H)^{-1}1. \qquad (32)$$

Note that the closed-form solution (32) for the power constraints does not maximize the PF utility function. However, from Eq. (27), we can see that the optimal solution, $\hat{\delta}_k$, is proportional to $w_k$ for k=1, . . . , K. Hence, we can reinforce the same property by modifying Eq. (31) to:

$$VW\delta=1, \qquad (33)$$

where W is a K×K diagonal matrix with $[W]_{kk}=\sqrt{w_k}$. The solution for Eq. (33) can be an approximation for the optimization problem (30). The final solution is:

$$\hat{\delta}=W^2V^H(VW^2V^H)^{-1}1. \qquad (34)$$

The solution shown in Eq. (34) is the sub-optimized solution for power-allocation optimization problem (30). However, with the closed-form expression, the computational cost for achieving (34) is greatly reduced compared with the aforementioned dual-decomposition optimization process.

In an alternative embodiment, the power restriction requirement for CoMP is expressed as a restriction condition for total transmit power, and the optimization problem becomes:

$$\max_{\{\delta_1,\ldots,\delta_k\}} \sum_{k=1}^{K} w_k \log \delta_k \quad (35)$$

$$\text{s.t.} \sum_{m=1}^{M}\sum_{k=1}^{K} v_{mk}\delta_k \leq M.$$

Note that instead of having multiple power constraints, (35) only has one total power constraint. The one constraint makes solving optimization problem (35) less computationally costly than solving optimization problem (24), which has to satisfy power constraints for each individual eNode-B. In one embodiment, optimization problem (35) can be solved using a dual-decomposition method. Note that, without the individual eNode-B power constraints, the solution for (35) may cause one or more eNode-Bs to exceed their maximum transmit power, i.e., $$\sum_{k=1}^{K} v_{mk}\delta_k > 1$$

for certain m. In such a scenario, the system can back-off the power for those eNode-Bs that violate their maximum allowed transmission power. In other words, based on the optimal solution for (35), the system reduces the transmission power of the violating eNode-Bs to their maximum allowed transmission power. In one embodiment, the power back-off is performed by proportionally decreasing the value of $\delta_k$ until the transmit power of that eNode-B is reduced to its maximum allowed power. Note that compared with conventional approaches where the transmission power of every eNode-B needs to be reduced, embodiments of the present invention only back-off power of the eNode-Bs having assigned power exceeding the maximum allowed power, thus ensuring overall better performance than the conventional approaches.

Figure 4:
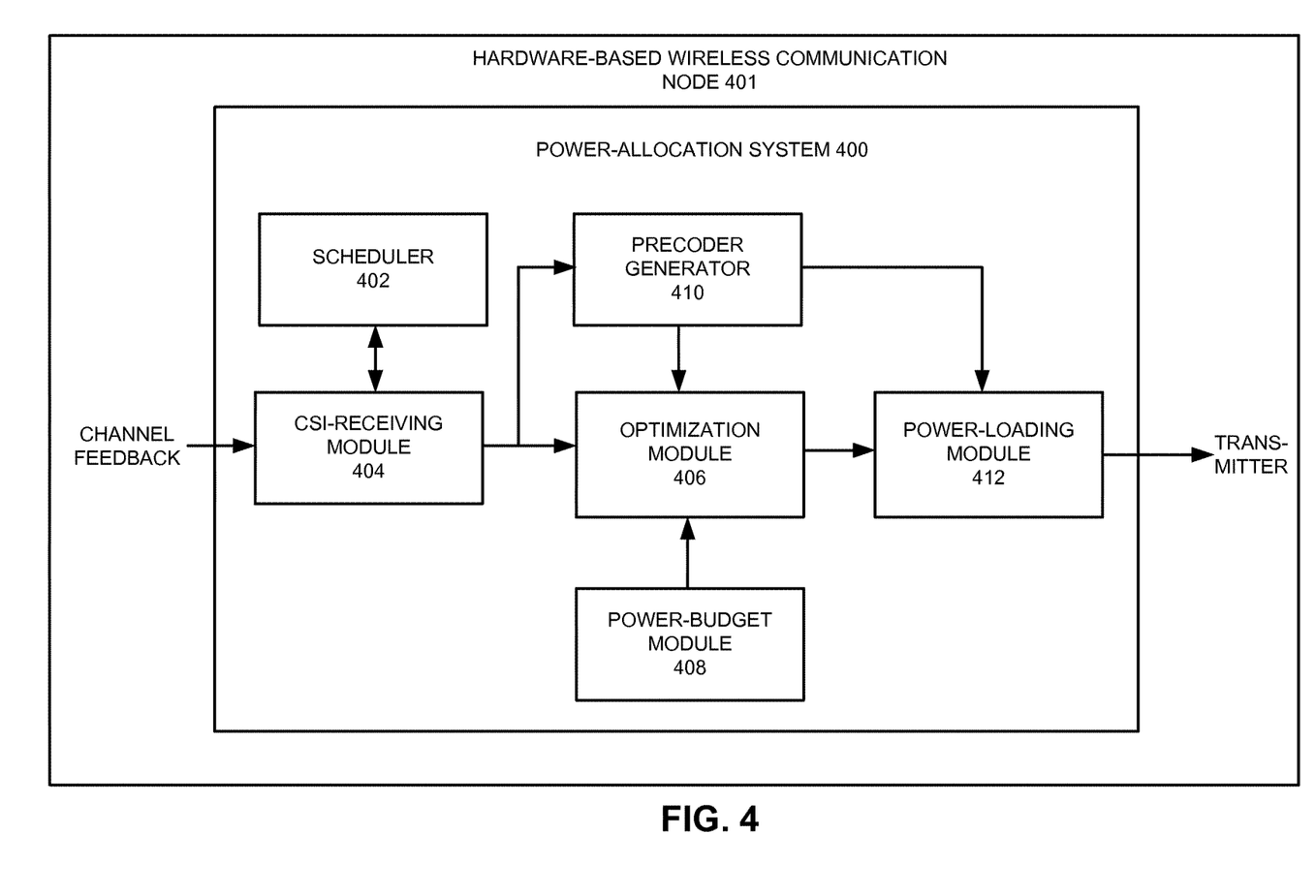
FIG. 4 presents an exemplary system for allocating downlink power to paired UEs in MU-MIMO, in accordance with an embodiment of the present invention.

FIG. 4 presents an exemplary system for allocating downlink power to paired UEs in MU-MIMO, in accordance with an embodiment of the present invention. A power-allocation system 400, which in one embodiment resides within a hardware-based wireless communication node 401, includes a scheduler 402, a channel-station-information (CSI)-receiving module 404, an optimization module 406, a power-budget module 408, a precoder generator 410, and a power-loading module 412.

Scheduler 402 is part of the eNode-B media access control (MAC) sub-layer, which is responsible for scheduling transmissions over the LTE air interface in both the downlink and uplink directions. More specifically, scheduler 402 schedules downlink/uplink transmissions and allocates the physical layer resources to be used. In one embodiment, scheduler 402 runs the scheduling algorithms which determine what gets sent, when, and to/by whom. In a further embodiment, scheduler 402 uses a proportional fairness (PF) scheduling algorithm, and assigns a PF weight to each individual UE. Scheduler 402 makes scheduling decision based on a number of utility metrics, including, but not limited to: data throughput (system or per UE), per-UE experienced packet delay, fairness in resource allocation among UEs, etc. For MU-MINO, scheduler 402 is also responsible for pairing co-transmitted UEs based on the spatial diversity among UEs. Scheduler 402 can be implemented using an application-specific integrated circuit (ASIC) chip or a field-programmable gate array (FPGA) chip. Alternatively, scheduler 402 may be implemented using a software module executing by a processor.

During operation, scheduler 402 receives inputs from various sources which guide scheduling algorithms. In one embodiment, scheduler 402 receives input from CSI-receiving module 404, which is responsible for receiving CSI for channels between the transmitting eNode-B (in the case of CoMP, the cluster of eNode-Bs) and the paired UEs. In one embodiment, CSI-receiving module 404 includes a base-station receiver capable of receiving channel feedback signals transmitted from the corresponding UEs. The received channel feedback signals can be used to construct channel matrices, which are sent to precoder generator 410 for generating an appropriate precoder. In one embodiment, a zero-forcing precoder is generated based on the channel matrices.

Optimization module 406 is responsible for performing an optimization that maximizes a utility metric of scheduler 402 based on the CSI and the output of power budget module 408, which ensures that the transmit power of an eNode-B does not exceed the available maximum power for that eNode-B. In one embodiment, the utility metric of scheduler 402 is the PF weighted sum rate of all paired UEs. The PF weighted sum rate is a function of the generated precoder and a diagonal power-allocation matrix. The diagonal entries of the power-allocation matrix represent power scale factors for corresponding UEs. In other words, the transmit power to a particular UE is scaled using a corresponding scale factor. Optimal scale factors that maximize the weighted sum rate under proper transmit power constraints can be found by solving the optimization problem.

Various methods can be used to solve the optimization problem. In one embodiment, optimization module 406 uses high SNR approximation to get a closed-form solution of the optimal scale factors. In one embodiment, optimization module 406 uses the exact Shannon rate as the instantaneous UE rate. In this scenario, no closed-form solution is available and various optimization algorithms can be used. In a further embodiment, optimization module 406 uses a dual-decomposition method to solve the optimization problem. Note that for CoMP scenarios, optimization module 406 may obtain a semi-optimal closed-form solution for the power scale factors. To obtain an optimal solution for CoMP, in one embodiment, optimization module 406 maximizes the weighted sum rate of paired UEs while abiding by power restriction requirements for each individual transmitting eNode-B. The solution for this optimization problem can be obtained using the dual-decomposition method. To simplify the computation process, in an alternative embodiment, optimization module 406 maximizes the PF weighted sum rate of paired UEs while abiding by a unified power restriction requirement that only restricts the total transmit power from all participating eNode-Bs. The resulting power scale factors are then applied to the precoders, and the transmit power of each eNode-B is compared to the maximum allowed transmit power of the eNode-B. Note that this comparison can be performed by power-budget module 408. If the transmit power of certain eNode-Bs exceeds their maximum allowed power, optimization module 406 reduces corresponding power scale factors until the transmit power of that eNode-B is reduced to the maximum allowed power.

Optimization module 406 outputs the optimal (or semi-optimal) power scale factors to power-loading module 412, which combines the power scale factors with the precoder generated by precoder generator 410 to control the signal transmission to the paired UEs.

The elements of power-allocation system 400 may be implemented as specific hardware logic blocks. For example, the CSI-receiving module 404 may be a receiver of a base station, the schedule 402, optimization module 406, power-budget module 408, and power-loading module 412 may be, such as, a special digital signal processor, a custom circuit, a custom ASIC, an FPGA chip, or so on for implementing the respective functions of each one as described in the disclosure. In an alternative, the elements of power-allocation system 400 may be implemented as software executing in a processor, controller, ASIC, or so on. In this scenario, these modules in power-allocation system 400 may be software modules, and may be used to implement various ones of the embodiments discussed above in the disclosure. In yet another alternative, the elements of power-allocation system 400 may be implemented as a combination of software and/or hardware.

Figure 5:
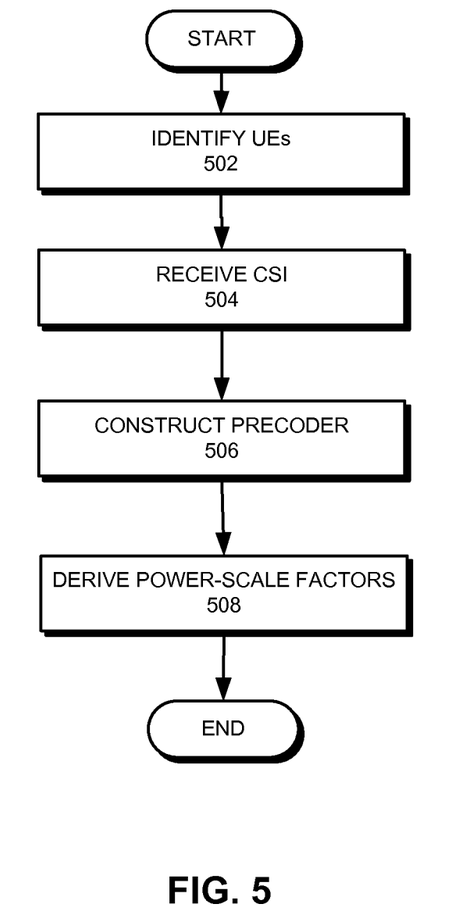
FIG. 5 presents a diagram illustrating an exemplary process of allocating power for UEs, in accordance with an embodiment of the present invention.

FIG. 5 presents a diagram illustrating an exemplary process of allocating power for UEs, in accordance with an embodiment of the present invention. During operation, the system identifies a set of UEs that can be paired together to share the same time-frequency resource (operation 502). In one embodiment, the scheduler uses a proportional fairness algorithm to pair UEs. Consequently, the paired UEs are active UEs for that time-frequency slot. The system receives CSI for the paired UEs (operation 504). In one embodiment, receiving the CSI involves receiving feedback to CSI reference signals from the UEs. The UEs report reference signal received power (RSRP) and reference signal received quality (RSRQ) for the CSI-reference signals to the base stations. The downlink CSI may include a channel quality indication (CQI), a precoding matrix index (PMI), and a rank indicator (RI).

The system then constructs a precoder based on the received CSI (operation 506). The precoder is designed to maximize the system throughput. Subsequently, the system derives a set of per-UE based power-scale factors based on a utility function (operation 508). The utility function can be the PF weighted sum rate of the UEs, and deriving the power-scale factors involves optimizing the PF weighted sum rate. In a further embodiment, solving the optimization problem involves a dual-decomposition process.

Figure 6:
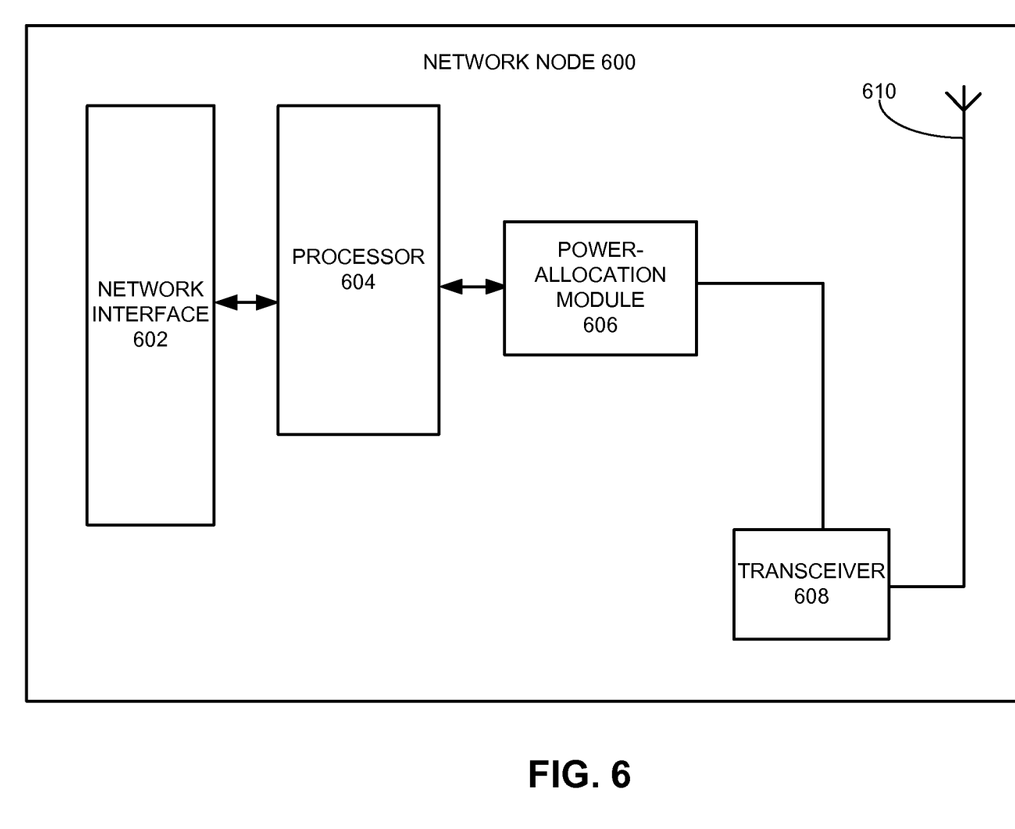
FIG. 6 presents a diagram illustrating the architecture of an exemplary network node, in accordance with an embodiment of the present invention.

FIG. 6 presents a diagram illustrating the architecture of an exemplary network node, in accordance with an embodiment of the present invention. A network node 600 includes a network interface 602, a processor 604, a power-allocation module 606, a transceiver 608, and an antenna 610. During operation, network node 600 interacts with the core network via network interface 602. Processor 604 executes applications for power-allocation module 606. Transceiver 608 receives uplink signals from and transmits downlink signals to other nodes via antenna 610. While transmitting downlink signals, transceiver 608 determines its transmit power for each receiving node based on the output of power-allocation module 606.

Embodiments of the present invention provide a method and a system for achieving higher aggregate throughput for an MU-MIMO system while satisfying power restriction requirements. For MU-MIMO transmission, transmit power to paired UEs are scaled based on a utility metric of the scheduler. For CoMP MU-MIMO, the power restriction requirement for individual transmit eNode-Bs is satisfied. Although per-UE power allocation is not included in currently available standards, this easily implemented scheme can be used to better promote CoMP because it improves overall system performance.

Note that the process shown in FIG. 2 and the block diagrams shown in FIGS. 3 and 4 are merely exemplary and should not limit the scope of this disclosure. For example, in FIG. 2, the system first selects an initial value for $\lambda$; in practice, it is also possible to first initialize the value of $\hat{\delta}_k$. The system and node shown in FIGS. 3 and 4 may have more or fewer components. In addition, this disclosure uses the maximum PF weighted sum rate as an example of scheduler utility metrics. In practice, other types of scheduler utility metric, such as minimum mean-square-error (MSE) of received signals, can also be used. Moreover other types of precoder than zero-forcing precoders, can also be used as long as it improves the DL performance.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   identifying, by a base station, a set of receivers in a wireless multiple-input multiple-output (MIMO) system for receiving signals from one or more transmitters on a same time-frequency slot;
   receiving, by the base station, channel state information (CSI) for communication channels between the identified receivers and the transmitters;
   constructing a precoder based on the CSI; and deriving a set of power-scale factors for the precoder based on a utility function associated with the identified receivers such that the power-scale factors optimize the utility function, wherein a respective power-scale factor scales power transmitted to a corresponding receiver.

2. The method of claim 1, wherein the utility function is a proportional fairness (PF) weighted sum rate.

3. The method of claim 1, wherein deriving the power-scale factors comprises applying a power constraint requirement while optimizing the utility function.

4. The method of claim 3, wherein the power constraint requirement is applied to transmit power of each individual transmitter.

5. The method of claim 3, wherein the power constraint requirement is applied to total transmit power of all transmitters.

6. The method of claim 5, further comprising:
identifying a transmitter having transmit power exceeding an allowed maximum value; and
reducing power scale factors associated with the identified transmitter such that the transmit power of the identified transmitter is reduced to the allowed maximum value.

7. The method of claim 1, wherein deriving the power-scale factors comprises using a dual-decomposition method.

8. The method of claim 1, wherein the precoder is a zero-forcing precoder.

9. A system comprising:
a processor; and
a non-transitory storage medium operatively coupled to the processor, wherein the processor is configured to:
identify a set of receivers in a wireless multiple-input multiple-output (MIMO) system for receiving signals from one or more transmitters on a same time-frequency slot;
receive channel state information (CSI) for communication channels between the identified receivers and the transmitters;
construct a precoder based on the CSI; and
derive a set of power-scale factors for the precoder based on a utility function associated with the identified receivers such that the power-scale factors optimize the utility function, and wherein a respective power-scale factor scales power transmitted to a corresponding receiver.

10. The system of claim 9, wherein the utility function is a proportional fairness (PF) weighted sum rate.

11. The system of claim 9, wherein while deriving the power-scale factors, the processor is configured to apply a power constraint requirement while optimizing the utility function.

12. The system of claim 11, wherein the power constraint requirement is applied to transmit power of each individual transmitter.

13. The system of claim 11, wherein the power constraint requirement is applied to total transmit power of all transmitters.

14. The system of claim 13, wherein the processor is further configured to:
identify a transmitter having transmit power exceeding an allowed maximum value; and
reduce power scale factors associated with the identified transmitter such that the transmit power of the identified transmitter is reduced to the allowed maximum value.

15. The system of claim 9, wherein while deriving the power-scale factors, the processor is configured to use a dual-decomposition method.

16. The system of claim 9, wherein the precoder is a zero-forcing precoder.

17. A multiple-input multiple-output (MIMO) node, the node comprising:
a scheduler configured to identify a set of receivers for receiving signals from one or more transmitters on a same time-frequency slot;
a CSI-receiving module operatively coupled to the scheduler, and configured to receive channel state information (CSI) for communication channels between the identified receivers and the transmitters;
a precoder-generator operatively coupled to the CSI-receiving module and configured to generate a precoder based on the CSI; and
an optimization module operatively coupled to the precoder-generator and configured to derive a set of power-scale factors for the precoder based on a utility function associated with the identified receivers such that the power-scale factors optimize the utility function, and wherein a respective power-scale factor scales power transmitted to a corresponding receiver.

18. The node of claim 17, wherein the utility function is a proportional fairness (PF) weighted sum rate.

19. The node of claim 17, wherein the optimization module is configured to apply a power constraint requirement while optimizing the utility function.

20. The node of claim 19, wherein the power constraint requirement is applied to transmit power of each individual transmitter.

21. The node of claim 19, wherein the power constraint requirement is applied to total transmit power of all transmitters.

22. The node of claim 21, wherein the optimization module is further configured to:
identify a transmitter having transmit power exceeding an allowed maximum value; and
reduce power scale factors associated with the identified transmitter such that the transmit power of the identified transmitter is reduced to the allowed maximum value.

23. The node of claim 17, wherein while deriving the power-scale factors, the optimization module is configured to use a dual-decomposition method.

24. The node of claim 17, wherein the precoder is a zero-forcing precoder.

25. A computer program product comprising a non-transitory computer readable medium comprising computer executable instructions that when executed causes at least one processor to perform:
identifying a set of receivers in a wireless multiple-input multiple-output (MIMO) system for receiving signals from one or more transmitters on a same time-frequency slot;
receiving channel state information (CSI) for communication channels between the identified receivers and the transmitters;
constructing a precoder based on the CSI; and
deriving a set of power-scale factors for the precoder based on a utility function associated with the identified receivers such that the power-scale factors optimize the utility function, and wherein a respective power-scale factor scales power transmitted to a corresponding receiver.

26. The computer program product of claim 25, wherein the utility function is a proportional fairness (PF) weighted sum rate.

27. The computer program product of claim 25, wherein deriving the power-scale factors comprises applying a power constraint requirement while optimizing the utility function.

28. The computer program product of claim 27, wherein the power constraint requirement is applied to transmit power of each individual transmitter.

29. The computer program product of claim 27, wherein the power constraint requirement is applied to total transmit power of all transmitters.

30. The computer program product of claim 29, wherein the computer executable instructions when executed further implement:
  identifying a transmitter having transmit power exceeding an allowed maximum value; and
  reducing power scale factors associated with the identified transmitter such that the transmit power of the identified transmitter is reduced to the allowed maximum value.

31. The computer program product of claim 25, wherein deriving the power-scale factors comprises using a dual-decomposition method.

32. The computer program product of claim 25, wherein the precoder is a zero-forcing precoder.

* * * * *